P. W. WINKELMANN.
MILK JAR HOLDER.
APPLICATION FILED MAR. 7, 1910.

1,058,126.

Patented Apr. 8, 1913.

2 SHEETS—SHEET 1.

Witnesses:
R. A. White
H. R. Lewhite

Inventor:
Paul W. Winkelmann
Jno. G. Elliott
By
Atty.

COLUMBIA PLANOGRAPH CO., WASHINGTON, D. C.

P. W. WINKELMANN.
MILK JAR HOLDER.
APPLICATION FILED MAR. 7, 1910.
1,058,126.
Patented Apr. 8, 1913.
2 SHEETS—SHEET 2.
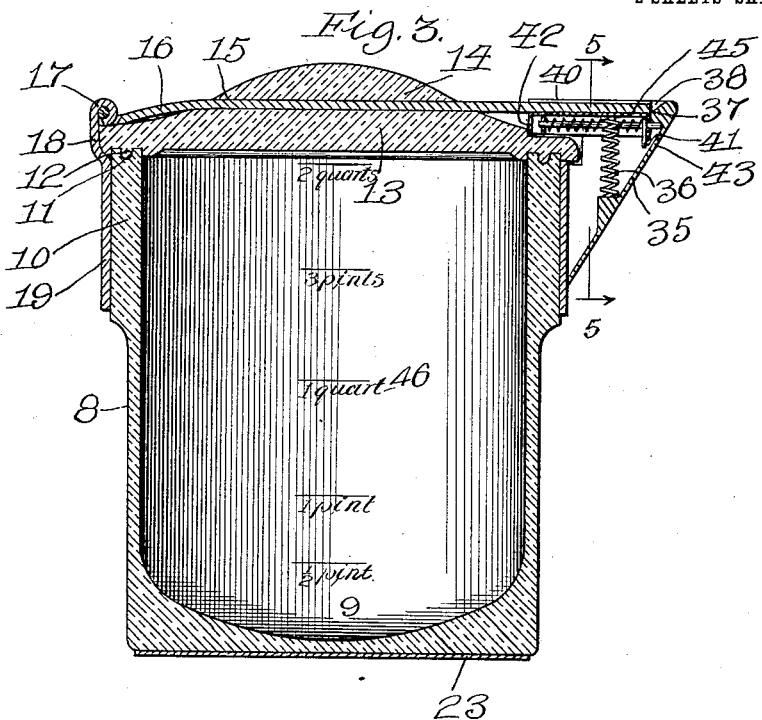
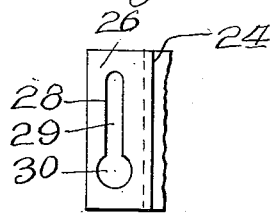
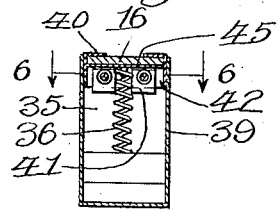
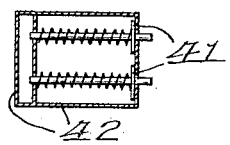
Witnesses:
R. A. White.
H. B. L. White.
Inventor:
Paul W. Winkelmann
By Jno. G. Elliott
Atty.
COLUMBIA PLANOGRAPH CO., WASHINGTON, D. C.

UNITED STATES PATENT OFFICE.

PAUL W. WINKELMANN, OF CHICAGO, ILLINOIS.

MILK-JAR HOLDER.

1,058,126. Specification of Letters Patent. Patented Apr. 8, 1913.

Application filed March 7, 1910. Serial No. 547,624.

*To all whom it may concern:*

Be it known that I, PAUL W. WINKELMANN, a citizen of the United States, and a resident of Chicago, in the county of Cook and State of Illinois, have invented certain new and useful Improvements in Milk-Jar Holders, of which the following is a full, clear, and exact specification.

This invention relates to improvements in jar holders, and more specifically for the delivery of milk from a milkman for family use, and for which purpose no means have heretofore been provided for preventing stealing the delivered milk either by emptying or carrying away the jar containing it, or the money or milk tickets left with the empty jar to pay for its refilling.

The prime object of my invention is to deliver milk in earthenware jars to families before their wakening hours and during their absence, the contents of which jars is accessible only to the milkman and members of the family, and the jars removable from their holder only by the family members.

Another object of this invention is a milk jar holder provided with a coin receptacle that is accessible only when the cover of the jar is opened.

A further object of my invention is a milk jar holder adapted to be removably supported from a door frame by means and in such a manner that when the door is closed it cannot be detached from its support.

With these ends in view, my invention finds embodiment in certain features of novelty in the construction, combination and arrangement of parts by which the said objects and certain other objects are hereinafter attained, all as fully described with reference to the accompanying drawings, and more particularly pointed out in the claims.

Figure 1:
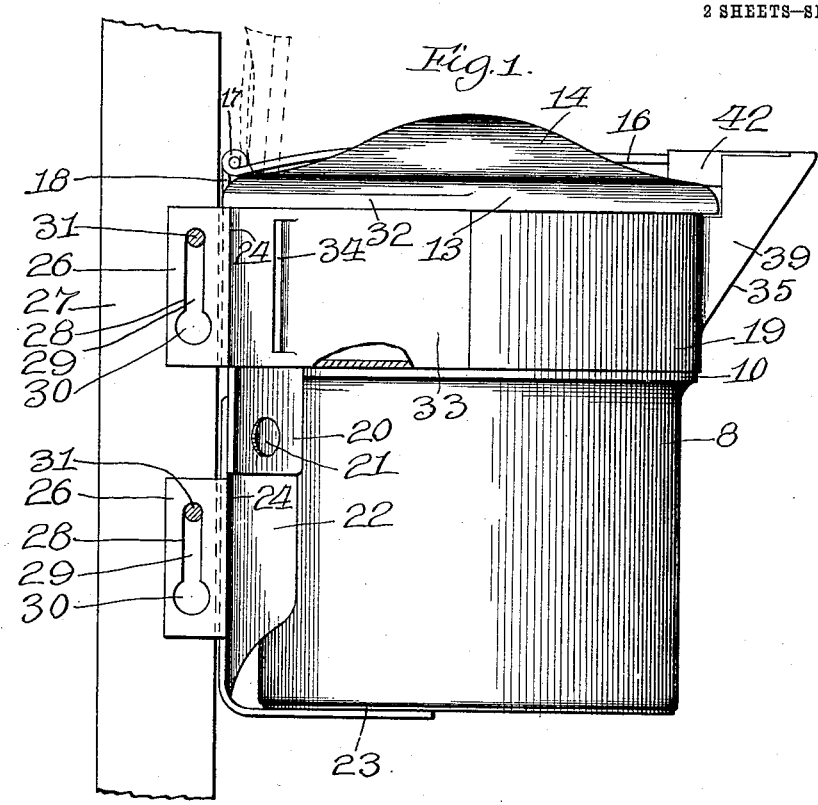
Figure 2:
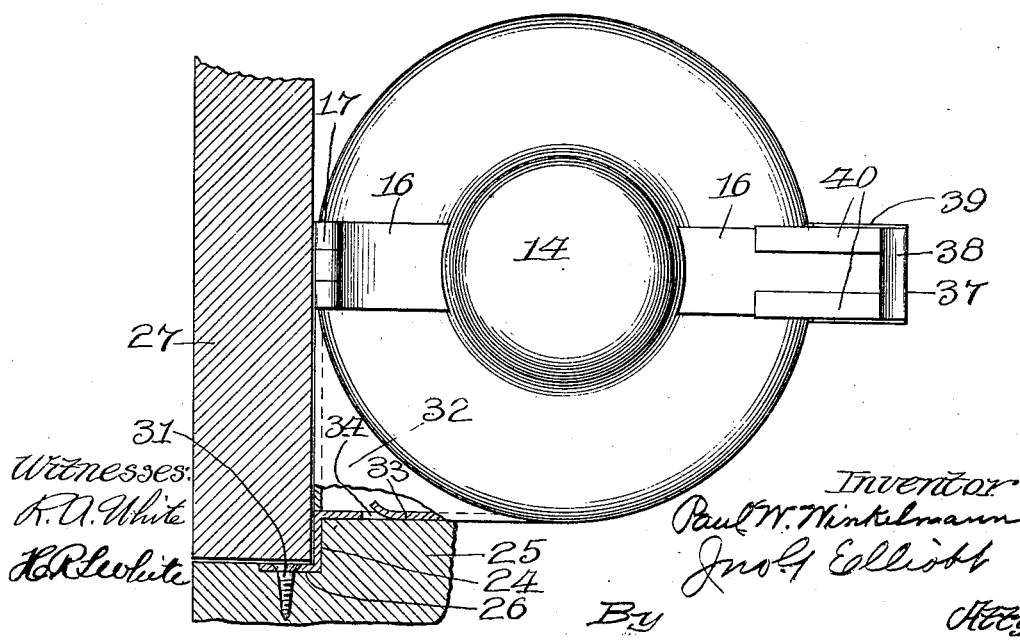

Figure 1 illustrates a jar holder, and milk jar in side elevation, in its operative position, locking the jar closed, with dotted lines indicating the elevated open position of the jar cover. Fig. 2 is a top plan view of the same. Fig. 3 is a central vertical section through the locking hasp and devices. Fig. 4 is an enlarged detail of the slotted projection by which the holder is removably secured to a door frame. Fig. 5 is a vertical section through the locking devices and hasp on the line 5—5 of Fig. 3. Fig. 6 is a transverse section of the locking device on the line 6—6 of Fig. 5, and Fig. 7 is a perspective view of a key for operating the lock.

Similar characters of reference indicate the same parts in the several figures of the drawings.

8 indicates a jar designed for holding milk, or may be for other materials, preferably constructed of earthenware, and provided with a concave bottom 9, struck more or less on the arc of a circle to facilitate cleansing the jar of impurities deposited from its contents or from other sources, the jar being preferably thickened, as indicated at 10, for the purpose of resisting otherwise destructive compression on the part of its holder hereinafter described, and to provide for an annular recess 11 in its upper edge for receiving a projection 12, on a cover 13, for forming a dust proof joint between the cover and the jar, and as far as need or may be an air tight connection between these two members.

The cover 13, like the jar, is preferably of earthenware, and is, (see Figs. 1 and 3) thickened on its top as indicated at 14 to provide for a slot 15 removably securing the cover upon a hasp 16, hinged at 17 to its shank 18, projecting from a band 19 and preferably integral therewith. The band 19 surrounds the jar 8 sufficiently close to prevent any substantial lateral movement of the jar, but need not be sufficiently tight to bodily suspend the jar either by compression or friction when the holder is provided with some other bodily support for the jar.

Integral with or otherwise secured to and depending from the band or collar 19 is a lug 20 from which, by means of a pivot 21, is suspended on arm 22 from which projects inwardly a bottom support 23, preferably a plate for the jar, the pivot 21 providing a means by which the bottom support 23, when and only when the holder is detached from the door frame, may be swung from under the jar to permit removing the jar from its holder, by lowering it through and below the holder band 19.

From the band 19 (see Figs. 1 and 2)

projects a locking plate bent at a right angle, one member 24 of which plate is adapted to lie flat against the face of a door frame or stop 25, and the other member 26 against the inner face of the casing door stop, opposite the edge of the door 27 when closed. The pivoted arm 22 is provided with a similar locking plate likewise adapted to occupy the positions of the band locking plate just described, and in most instances, the free ends of these locking plates (see Fig. 4) are provided with an elongated slot 29, having enlargements 30, at the lower ends thereof, adapted to pass over the heads of individual screws 31 (see Fig. 1) screwed into the door frame or its stop with sufficient space between the heads of the screws and the face of the door frame so that after the heads are projected through the plates, the metal, forming the sides of the narrow slot, will project under the screw heads and lock the holder against accidental detachment, and be supported by the upper end walls of the narrow slots.

Ordinarily, and with but few exceptions, there is sufficient space, between the door and the adjacent edge of the door frame, for the reception of the member 16 of the angular locking plate, and, as to these exceptions it requires but a few minutes with a chisel to counterseat the plate if necessary. When there is not sufficient space, owing to the thickness of both the plate and the screw heads, to prevent a binding action on the part of the door when closed, it is only necessary to make two depressions in the edge of the door to receive the screw heads.

It is the intention to have the jar holder project outwardly from the door, and it will, therefore, be seen that with the door closed, as indicated in Fig. 2, it is impossible to detach the holder from its supports until the door is opened, and as this is usually done by swinging it inwardly of the house only the occupants of the house can unlock the holder.

The jar cover 13 preferably has formed therewith at one side (see Fig. 2) an angular projection 32 for forming the top (see Fig. 1) of a coin receptacle 33, provided with a coin slot 34, which coin receptacle is fixed to the band 19, and is only accessible for removing the coin or coins by swinging the cover to an upright open position.

To the front side of the band 19 (see Fig. 3) is secured a receptacle 35 for a spring 36, the normal operation of which is to lift the cover from its seat on the jar, and to this end one end of the spring is seated on the wall of the receptacle 35 with its other end bearing against the underside of the hasp 16, which receptacle 35 also has formed on or secured thereto a keeper 37 for latch bolts 38, of which there may be two as shown in Fig. 5, supported in a casing 39, and normally projected therefrom by springs 40 bearing against depending lugs 41 secured to the latch bolts, and at the other end against a fixed plate 42 through perforations in which the latch bolts have an endwise movement. In the front wall of the receptacle 35 are perforations 43 registering with the lugs 41, whereby, by the insertion of a key 44, such as illustrated in Fig. 7, the bolts may be pushed away from the engagement with their keepers 37 when the jar may be uncovered by swinging its cover to an upright position.

Projecting from the top of the casing are angle plates 45, 45, forming a guide and means for securing the latch case to the hasp by a sliding movement so that when, for any reason, either the latch or the jar cover, or both, are injured sufficiently to require the substitution of new parts or repairs, they may be quickly removed for that purpose, it being the intention that the milkman shall carry in his wagon a few extra covers and in his pockets one or more of these complete and detachable latch devices for substitution whenever desirable or necessary.

The jar may be provided internally with a gage 46 cast therein, from which the milkman may determine the amount of milk to be delivered, as indicated by the coin or milk ticket deposited in the coin receptacle. When the jar and its holder are in their operative position, as shown in Figs. 1 and 2, the coin slot is covered by the face of the jamb of the door frame and inaccessible to outsiders until swung to an open position by the milkman.

When the bottom support 23 is in the position shown in Fig. 1, it is immovable until the holder is detached from its suspending device, owing to the fact that the door frame operates as a stop against any movement on the part of the pivoted arm of the support, but, on detaching the holder from the door frame the arm may be swung away from the jar which may then be lowered from the holder. With the jar and its holder in the position shown in Fig. 1, and a coin or milk ticket in the receptacle thereof, the milkman unlocks the cover, and, after removing the coin or ticket from its receptacle, and determining therefrom the amount of milk to fill the order indicated thereby, pours the milk accordingly into the jar. Subsequently, and at such time as the occupant of the house may desire the milk for use, the house door is opened, the holder removed from its supports and the jar removed therefrom by swinging the support 23 away from it and removing the jar from the holder as before described when the holder may be replaced upon its supports, or, on the other hand, it may be removed and carried with the jar into the house remaining there until it is desired to give an order for a further supply of milk, which is done by inserting the coin or ticket into the receptacle and returning the holder and the jar to their original operative position.

If it is desired, as frequently happens, to sterilize the milk, the cover of an ordinary tea kettle is removed and the jar inserted therein, and subjected to hot water or steam, as already described.

The advantages of my invention to users of milk, among other things, is the possibility of having milk delivered and kept for use in a stone jar unexposed to any other material, and for access thereto of foreign substances from the time of its delivery until removed into the house; that the user may, without being present, pay cash for exactly the amount of milk ordered; that such cash is not accessible to any one save the milkman even through the coin slot; that the receiving receptacle therefor is of the best possible material for holding milk until it is used; that such receptacle affords the convenient means in which to sterilize milk without the possibility of scorching it, and to the milkman that it insures a certainty of delivery of milk to his customer against the possibility of stealing, such as is common to the employment of milk bottles of the present day, and that he receives the cash therefor on delivery and avoids any necessity for book accounts and subsequent collections which, even with collectable accounts, often require more time for their collection than was involved in delivering the milk to the customer.

While it is not only preferable, but more sanitary, to employ milk jars of the form and material described, it is obvious that without more than ordinary mechanical skill, my invention, so far as the holder is concerned, may be adapted for use in connection with the milk bottles now commonly and generally used, or with glass receptacles of the form and provided with covers as shown herein, but, under the modern sanitary demands for the delivery of milk in capped glass bottles, my invention is of special importance in providing, as it does, for the use of earthenware receptacles, the safe and certain delivery of milk to the customer and the prevention of loss both to the milkman and the user, while, at the same time, is provided with a vessel which is dust proof, and substantially air proof, and of a material and form that enables it to be thoroughly cleansed of all impurities and which can be perfectly sterilized both quickly and conveniently with a minimum amount of labor.

In conclusion, it should be observed that the embodiment of my invention is not limited to the special details of construction herein shown and described, and that, therefore, it includes any changes that may be made by which milk delivery receptacles, and especially crock-like earthenware receptacles, as distinguished from bottle like receptacles or glass or other materials, may be used, with an entire absence of the present liability of the milk being tampered with after delivery and before use, and the milk or the consideration therefor, and particularly the former, from being surreptitiously taken from or removed with its receptacle.

Having described my invention, what I claim and desire to secure by Letters Patent is:—

1. A jar holder comprising in combination a retaining collar embracing the body of the jar, a bottom supporting plate, a hinge connecting the collar and plate, and means for rigidly securing the plate in its operative position, substantially as described.

2. A jar holder comprising in combination a retaining collar embracing the body of the jar, a bottom support for the jar, a hinge connecting the collar with said support, and means whereby the holder may be supported and locked by and between the directly opposing surfaces of a door frame and a door therefor, when the latter is closed, substantially as described.

3. A jar holder comprising in combination a retaining collar embracing the body of the jar, a hasp hinged thereto extending entirely across said jar and adapted to support a jar cover removable therefrom, and means for locking said cover in position for closing a jar, substantially as described.

4. A jar holder comprising in combination a retainer collar embracing the body of the jar, a jar cover hinged thereto and adapted to be swung to and from a position seating the cover upon a jar supported therein, and means whereby said holder may be supported, clamped and locked between the directly opposing surfaces of a closed door and a jamb therefor, substantially as described.

5. A milk jar holder comprising in combination a retaining band embracing the body of the jar, means for supporting and locking said band directly between a closed door and its jamb, a jar cover hinged to said holder, and means for locking the cover to the jar holder when seated upon a jar supported by the holder, substantially as described.

6. A jar holder comprising in combination a retaining collar embracing the body of the jar, a bottom support hinged thereto, means removably supporting and clamping said holder in a locked position between the opposing surface of a door frame and a closed door, a hasp hinged to said collar, a jar cover and a locking device removably supported upon said hasp, substantially as described.

7. A jar holder comprising in combination a retaining collar embracing the body of the jar, a hasp hinged to said collar, a jar cover and a locking device mounted upon said hasp, means for supporting said holder in its operative position, and a coin receptacle open and closed by the jar cover, substantially as desecribed.

In witness whereof, I have hereunto set my hand and affixed my seal, this 3rd day of March A. D. 1910.

PAUL W. WINKELMANN. [L. S.]

Witnesses:
F. E. BROM,
JNO. G. ELLIOTT.

Copies of this patent may be obtained for five cents each, by addressing the "Commissioner of Patents, Washington, D. C."